United States Patent
Kanter

(10) Patent No.: US 8,537,452 B2
(45) Date of Patent: Sep. 17, 2013

(54) SYSTEM AND METHOD FOR GENERATING OPTICAL RADIATION OF CONTROLLABLE SPECTRAL CONTENT

(75) Inventor: Gregory S. Kanter, Chicago, IL (US)

(73) Assignee: Nucript LLC, Evanston, IL (US)

( * ) Notice: Subject to any disclaimer, the term of this patent is extended or adjusted under 35 U.S.C. 154(b) by 315 days.

(21) Appl. No.: 12/792,272

(22) Filed: Jun. 2, 2010

(65) Prior Publication Data
US 2011/0063711 A1    Mar. 17, 2011

Related U.S. Application Data

(60) Provisional application No. 61/220,385, filed on Jun. 25, 2009.

(51) Int. Cl.
*G02F 1/01* (2006.01)
(52) U.S. Cl.
USPC .......................................... 359/278
(58) Field of Classification Search
USPC .......................................... 359/278
See application file for complete search history.

(56) References Cited

U.S. PATENT DOCUMENTS 5,778,132 A * 7/1998 Csipkes et al. ............... 385/135

\* cited by examiner

*Primary Examiner* — James Jones
(74) *Attorney, Agent, or Firm* — Nadya Reingand

(57) ABSTRACT

An optical spectrum generator is disclosed, which is based on generating conjugate optical frequencies via the use of two or more nonlinear interactions, where filters are used to select the conjugate output of the preceding nonlinear interaction as the input to the following nonlinear interaction. The cascaded nonlinear interaction is seeded with an incoming optical beam and pumped with multiple pump beams. The conjugate output of the last nonlinear interaction can be fed-back to the input of the first nonlinear interaction thus creating a recirculating path. An add-drop multiplexer is implemented for efficiently combining the pump beams with conjugate beams. The generated output frequencies are related to the difference in frequency between the pumps which can be changed as a function of time to create a time-varying output frequency. The magnitude of the variation in output frequency can be magnified by recirculating the signal through the system multiple times.

36 Claims, 6 Drawing Sheets

SYSTEM AND METHOD FOR GENERATING OPTICAL RADIATION OF CONTROLLABLE SPECTRAL CONTENT

CROSS-REFERENCE TO RELATED APPLICATIONS

This application claims priority to U.S. provisional application No. 61/220,385 filed Jun. 25, 2009.

RIGHTS HELD BY GOVERNMENT ORGANIZATIONS

The United States Government has certain rights to this invention pursuant to contract No. W31P4Q-09-C-0182 from the US Army Aviation and Missile Command.

FIELD OF THE INVENTION

The present invention relates to generating optical radiation with controllable spectral content including frequency-shifted optical signals. In particular it pertains to the generation of chirped optical frequencies, time-varying optical frequencies, and optical comb lines.

BACKGROUND

Controlling the spectral characteristics of an optical source of radiation is used in various aspects of science and engineering. For instance, regularly spaced optical spectral lines, commonly called optical combs, can be used for highly precise metrology. Sources where the optical frequency is swept or "chirped" in time are used for biological imaging as well as optical ranging applications. The invention herein is a source of optical radiation whose spectrum can be tuned or reconfigured to generate many different spectral profiles, including an optical spectral output that varies in time. It makes use of a nonlinear optical interaction, such as the parametric gain induced by four-wave mixing in optical fiber, in order to control the spectral output of the source.

A scheme for realizing an optical source using a gain medium and a frequency shifting element configured in a recirculating loop has been disclosed in U.S. Pat. No. 5,101,291 and is often termed a frequency shifted feedback laser (FSFL) because the propagating mode is shifted in frequency before being fed-back to the gain element. This source uses an acousto-optical modulator to generate the frequency shift. Such a source has been used in various modes of operation including generating a standard fixed optical comb or a chirped optical comb {L. P. Yatsenko et al., "Theory of a frequency-shifted feedback laser," Optics Communications 236, 183-202 (2004)}, and generating an output with a narrow-band optical frequency that varies in time {H. Takesue and T. Horiguchi, "Broad-Band Lightwave Synthesized Frequency Sweeper Using Synchronous Filtering," J. Lightwave Technol. 22, pp. 755-757, 2004}. Although the output frequency varies in time, it does so by making a simple fixed frequency shift every round trip. The frequency shift is induced by an acousto-optic Bragg cell, which has a limited range of frequency shifts. This makes it difficult to tune the operation of the FSFL over a broad range of conditions including making frequency shifts that can vary substantially over short time periods.

An extension of such work is described in U.S. Pat. No. 5,734,493 where other methods, such as a single sideband modulator, are used as the shifting method. In principle this allows a wider range of frequency spacing between adjacent modes of the device, however it is still limited by the electrical bandwidth of the modulator.

A fundamentally different type of frequency shift which exploits nonlinear optical effects is described in U.S. Pat. No. 6,856,450 B2. Here two or more "frequency mirrors" are used to perform the shifting. The frequency mirrors use nonlinear optical interactions that can have very broad bandwidths. The frequency shift is typically equal to twice or four times the difference in the optical frequency of two pump sources, depending on if the nonlinear interaction is a second or third order effect. This method allows for a much greater range of frequency shifts. Although U.S. Pat. No. 6,856,450 describes some aspects of the basic geometry, the application is narrowly focused on the generation of regularly spaced comb lines or of frequency shifting a modulated signal onto a regularly spaced grid. Also, the optical amplifier used in the system, which is optional and is used to compensate for loop losses if the nonlinear interaction is not strong enough to do so itself, needs to have an optical bandwidth equal to the generated signal bandwidth. Thus, in practice the optical amplifier can be the limiting factor in determining the system's optical bandwidth. The designs disclosed are also not well suited for the use of fiber-based nonlinear interactions. Fiber-based nonlinear interactions are desirable since it is simple to splice the nonlinear fiber to other fiber-coupled components to make a robust and easily manufacturable system. In the case of the third-order nonlinearity of fibers, special consideration is required to combine the pump and signal together, since they are of similar optical frequency. Direct couplers, such as a 50/50 splitter, experience an inherent insertion loss when combining signals. Also, fiber nonlinearities can suffer from stimulated Brillouin scattering (SBS), which can limit the effective pump power attainable and therefore the effective gain or bandwidth of the nonlinear interaction. Suppression of SBS has been addressed in the context of other fiber nonlinear systems such as standard parametric amplifiers {"Fiber Optical Parametric Amplifiers, Oscillators and Related Devices" by M. E. Marhic, Cambridge University Press 2008}, although the typical techniques cannot be directly applied to the frequency mirror system since without special precautions the frequency modulation of the pumps is transferred to the generated signal.

Substantial optical chirp can be generated using a single-sideband modulator driven by a chirped electrical frequency. However the amount of chirp is ultimately limited by the bandwidth of the modulator, unless very difficult optical techniques are used to try to increase the chirp {K. W. Holman et al, "MIT/LL development of broadband linear frequency chirp for high resolution ladar," Proc SPIE v 6572 65720J-1, 2007}. Currently such optical techniques are not practical and are very difficult to scale to increase the chirp much past what is possible using a modulator alone. It is desired to be able to generate chirp over a larger frequency range.

Carrier suppressed return-to-zero (CSRZ) modulation can be used for generating a number of precisely controllable optical tones {C Yu, et al., "Multi-channel high-speed optical pulse train generation based on phase modulation at half frequency," Lasers and Electro-Optics, paper CMJJ7, CLEO 2007}. The CSRZ modulation suppresses the input carrier and generates tones spaced at ±nf, where n is an integer and f is the modulating frequency. However, typically only a few tones of useful magnitude are generated with a CSRZ modulator. One interesting property of CSRZ modulation is that if the modulation signal to the CSRZ modulator is chirped, it will generate side bands on either side of the suppressed carrier that are chirped in opposite directions.

The use of two (or more) optical comb lines with different frequency spacing has been used previously for metrology applications {F. Keilmann et al, "Time-domain mid-infrared frequency-comb spectrometer," Optics Letters v. 27, pp 1542-1544, July 2004}. However, they used two separate frequency locked optical comb systems. This is an expensive and bulky method of generating two combs or different spacing. A more compact and less expensive method is desired.

What is needed is a flexible method of controlling generated optical spectrum. For instance, a method of generating various types of chirped optical frequencies, including very large and fast optical chirps and optical combs that are uniformly chirped or have a chirped grid spacing. Chirp values larger or faster than those possible with electro-optical modulation alone are particularly useful. Another needed function is to generate optical frequencies that can be quickly reprogrammed to shift to another value where the magnitude of the shift can be programmed quickly and over a large range. Another need is for the generation of multiple combs each with a selectable comb spacing using a single robust device. These types of functions should be realized using optical techniques which are practical to implement. In many cases it is desirable to implement such an optical spectrum generator using fiber-based nonlinearities. In such cases, SBS may need to be suppressed and the pump and recirculating signal need to be combined with low losses. If an optical amplifier is required, it should be configured so as not to limit the optical bandwidth of the system.

SUMMARY

A method and system for generating optical radiation of controllable spectral content is disclosed which can use various nonlinear optical interactions, including parametric amplification in optical fiber, to create a wide range of optical outputs. We will generically call the device an optical spectrum generator (OSG). In one embodiment, one or more of the optical pumps of the multiple nonlinear interactions exploited in the invention are chirped and thereby create a chirped signal output. In a system with two fiber-based nonlinear interactions, the output signal is chirped at twice the relative chirp between the two pumps. The action of the nonlinear interaction, particularly if it is repeatedly applied over multiple round trips, allows for the chirp of the pump to be magnified when transferred to the signal outputs. Depending on if a seed signal is present during a single or multiple round-trips through the device, the output may be a single chirped signal whose chirp value changes in time or multiple chirped signals separated in wavelength that have different amounts of chirp (an optical comb with a chirped comb separation frequency).

A carrier suppressed return-to-zero (CSRZ) modulator can be used to create the chirp on the pumps of the OSG. The two main optical outputs of a CSRZ modulator are located symmetrically in frequency with respect to the optical input but shifted in frequency by the modulation frequency of the CSRZ modulator. The optical input to the CSRZ modulator is suppressed at the CSRZ output. Thus a chirped modulation signal applied to the modulator creates two oppositely chirped outputs. These two oppositely chirped outputs can be used as the pumps in an optical spectrum generation system having two nonlinear interactions. This will therefore create a signal chirp of two times the pump frequency separation, which is four times the chirp sent to the CSRZ modulator. If the same pump chirp is repetitively applied as the signal recirculates through the OSG system then the resulting output signal chirp is magnified every round trip.

In another embodiment the input seed signal is chirped either instead of, or in addition to, the pump. This can create a chirped comb of fixed grid spacing or extend the chirp rate, respectively. If the seed signal is injected only during the first round trip and its frequency deviation over time is matched to be twice the difference in the two pump frequencies, then a quasi-continuous frequency scan over a large frequency range (n times the chirp of the seed signal in n round trips) can be generated.

In another embodiment, the frequencies of the optical pumps are changed over time in order to create a programmable sequence of output optical frequencies, where the frequency difference between successive outputs can be programmed over a wide range and that difference can vary in time. In some cases it is desirable to use a CSRZ modulator to control the pump optical frequency, although other standard means of changing the pump frequency such as the use of single-sideband modulation can also be used. The fact that the CSRZ modulator generates two shifted optical frequencies can be exploited to increase the range of possible frequency shifts of the OSG.

The system can also create regularly spaced optical comb lines, or comb lines that have non-uniform spacing. When using the system to create optical comb lines by using pumps that are not of the low duty-cycle short pulse variety, stimulated Brillouin scattering (SBS) can limit the effective intensity of the pump wave, especially for fiber-based nonlinearities. To combat that effect, the multiple pumps can be chirped in the same direction and timed such that the first pump operating on a given propagating signal temporal window in the first nonlinear interaction and the second pump operating on the same propagating signal temporal window in the second nonlinear interaction are chirped or otherwise modulated in the same way such that the difference the two pump optical frequencies remain constant with respect to a propagating signal. The change in their phase in time (equivalent to a change in frequency in time since the time derivative of phase is frequency) extends the pump bandwidth such that SBS is mitigated but the difference between the pump frequencies stays constant thereby cancelling out and not affecting the generated signal.

The parametric nonlinearity used as the frequency shifting element which is also used as a gain element can have a very large gain bandwidth. In some cases, the optical frequency between the pumps of the two nonlinear interactions are separated by a large frequency difference, in which case it may be advantageous to use fibers with different zero dispersion wavelengths so that each pump wavelength is optimized to produce the gain bandwidth profile most desirable. There may be an advantage to use standard optical amplification in the loop as well since that could reduce the required pump power needed for the nonlinear interaction. However, it may be difficult to find a standard amplifier, such as an erbium doped fiber amplifier, with sufficient gain bandwidth. By placing the optical amplifier after one of the generated bands from the nonlinear interaction has been filtered out, an amplifier with a gain bandwidth encompassing either the upper band or the lower band can be used, thereby reducing the required gain-bandwidth burden of the amplifier.

Particularly when the nonlinear interactions are third-order interactions, a narrow-band dense add-drop multiplexer can be used to combine the narrow band pumps with the potentially wide-band recirculating signals. Banded add-drop multiplexers can be used as filters to separate the upper and lower bands naturally generated in the OSG, where one band is removed from the loop to be used as an output port. Such techniques reduce the loop loss thereby allowing the system to function at lower pump powers. For instance, if a simple coupler is used to combine the pump and signals, then at least one of the signals must experience at least 3 dB loss. Wavelength selective add drop multiplexers can combine the closely spaced pump and signal bands with lower loss.

DETAILED DESCRIPTION OF THE PREFERRED EMBODIMENT

Figure 1:
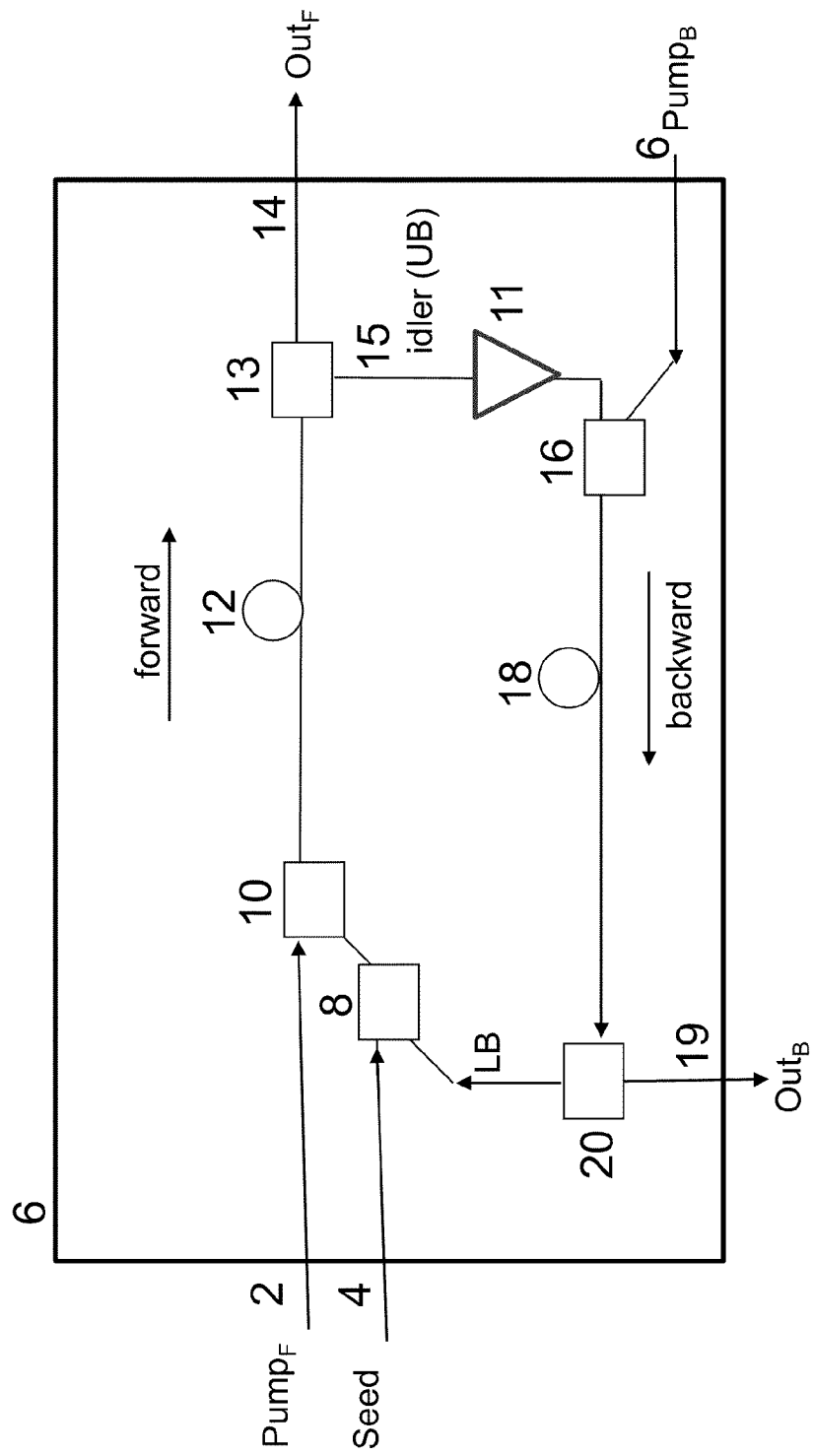
FIG. 1 is a functional block diagram for a basic optical spectrum generator (OSG).

A particular embodiment of the basic optical spectrum generation (OSG) system can be functionally described as shown in FIG. 1. In the figure we assume optical fiber is used as the nonlinear medium. Depending on the fiber type used polarization controllers may also be needed in the OSG to maintain a particular polarization relationship between the signals and the pump beams, but they are omitted here for simplicity. Well known feedback methods can be used to set the polarization controllers as needed. We focus primarily on the use of four-wave mixing in optical fiber as the nonlinear effect employed to create the frequency mirrors. In most instances other types of nonlinear effects such as second order nonlinearities or cascaded third order nonlinearities can be substituted in a straight forward way, as is known in the art, and thus the specific examples described herein should not be considered limiting the invention in scope. Some designs, such as those that mitigate the deleterious effect of stimulated Brillouin scattering (SBS), which is a substantial effect in typical optical fiber but not typically in second order medium such as lithium niobate crystals, are particularly well suited for the fiber medium. We generally assume two nonlinear interactions, which we call the forward and backward interaction, although it is apparent to one skilled in the art that more nonlinear stages could be added and that the two interactions could be in-line forming a single pass system instead of a recirculating loop. We will also use certain specific examples or parameters for the purposes of illustration, although they should not be taken as limiting the scope of the invention.

A first pump wave called the forward pump or pump$_F$ at an optical frequency $f_o$ is sent to the first pump injection port 2, where it is subsequently combined by a first pump wavelength dense wavelength division multiplexing (DWDM) add drop multiplexer (ADM) 10 with a seed wave of frequency $f_o$–d. The seed wave is injected into a seed wave injection port 4, and passed by a seed-wave DWDM ADM 8. The first pump wavelength DWDM ADM 10 is selected to combine the narrow-band pump near frequency $f_o$ with a potentially wideband signal, where the signal is initially is a seed wave at an optical frequency of $f_o$–d. We note that the pump ADM 10 could be replaced with a simple optical combiner, such as a 50/50 coupler, but in that case both the incoming pump and the recirculating signal, which at this point is just the seed wave since additional input frequencies to the pump ADM are not generated until the optical seed wave makes at least one round trip through the system, will experience loss. With any simple coupler acting as a combiner at least one of the input signals will experience at least 3 dB loss in transit to the output port. It is advantageous to use appropriate ADMs to minimize such losses, where the input signals are of different wavelengths and therefore can be combined with low loss. A DWDM ADM is specifically designed to combine one narrow band of optical frequencies with another non-overlapping broader band of optical frequencies. In the case of the first pump ADM 10, the narrow band is near the pump frequency $f_o$. In the case of the seed wave ADM 8, the narrow band is near the seed frequency $f_o$–d. After being combined in the pump ADM, the pump and seed waves propagate through a first nonlinear (NL) fiber 12 where the pump induces parametric gain via a four-wave mixing interaction. This gain amplifies the seed wave and generates a conjugate wave at frequency $f_o$+d. Thus $f_o$ serves as a reference frequency which is at the midpoint in frequency between the input signal frequency and the generated conjugate frequency. Such a nonlinear system generating the conjugate frequency can be called a nonlinear frequency mirror. In the event that a second order nonlinear medium is used as the frequency mirror, as opposed to the third order nonlinearity found in typical optical fiber, the pump optical frequency may be different from the reference frequency, for instance it may be twice the reference frequency. However, when using four wave mixing in optical fiber as the nonlinear interaction the reference frequency and pump frequency are identical. A banded ADM 13 acts as a filter which separates out the lower band (LB) components (frequencies$\leq f_o$) to a first output port 14, while the upper band (UB) components (frequencies$\geq f_o$+d) are sent to a second port 15. The banded ADM 13 thus also removes the forward pump from the system loop, although this function could be provided by an additional filter as well. An optional optical amplifier 11 is inserted after the banded ADM filter 13, so that the amplifier only needs to amplify one of the two generated bands. An OSG for which the signal is going to make multiple round trips through the loop will typically have a gain through the loop roughly equal to its loss. There can be inherent gain in the four-wave mixing interaction, but the pump power required to supply enough effective gain to overcome all losses may be higher than is convenient. The use of a standard amplifier can thus reduce the required pump power considerably. This can be helpful for suppressing SBS which limits the amount effective pump power that can be launched into the nonlinear fiber. The nonlinear interaction in the OSG may have a greater optical bandwidth than most amplifiers, so the placement of the internal loss-compensating optical amplifier such that it follows the dropping of one of the optical bands is desirable, thereby reducing the burden on the optical amplifier spectral bandwidth. Thus the ideal placement of the amplifier is after one of the banded ADM filters. The amplifier can be any type of optical amplifier, including Erbium doped fiber amplifiers, Raman amplifiers, or semi-conductor amplifiers. The UB is sent to a second pump DWDM ADM 16 that combines the UB with the second pump called the backwards pump or pump$_B$, which is at a frequency of f$_o$–δ/2 and is injected via a second pump injection port 6. The UB and pump interact in the second NL fiber 18 thereby amplifying the UB and generating LB idler spectrum, in this first round trip the LB spectrum being at f$_o$–d–δ. A second banded ADM 20 separates the UB signals and residual pump to a second output port 19 and recirculates the LB (with any pump$_B$ light removed) to the seed wave ADM, where it can be combined with the seed wave. The combination of the seedwave and any recirculated LB frequencies act as the input signal for the next round trip. In so doing a new input frequency at f$_o$–d–δ has been generated, and is combined with the seed wave in a DWDM ADM 8 and the resulting signal is combined with the forward pump in the following DWDM ADM 10. This starts the second round trip which thus has two signal frequencies, one at the input seed frequency and one at the seed frequency shifted by δ. Each round trip more frequencies spaced by δ will be generated in the upper and lower side bands. This can thus form a comb of optical lines with equal spacing of δ. Note that the generated signal has a frequency spacing twice as large as the difference between the two pump optical frequencies, or in this case also twice as large as the pump reference frequencies. The optical spectrum generation system 6 as described thus has three optical input ports 2,4,6 and two optical output ports 14,19. However, we note that the same basic function, where multiple optical beams are combined to form new optical frequencies in two sequential nonlinear interactions separated by filtering devices, can be created with various modifications. For instance, an optical tap could be placed after the NL fiber 18 and before the banded ADM filter 20, forming an additional output which would contain both the UB and the LB as well as pump$_B$, where pump$_B$ could be removed if desired with an appropriate DWDM filter. This would form an additional output containing both the UB and the LB, but would not change the basic functionality of the device. Thus, we will assume that the basic OSG system has inputs and outputs as depicted in 6, although this does not preclude other configurations.

The zero-dispersion wavelength of the nonlinear fiber used in the first and second nonlinear element may be chosen to be different from each other, especially if the forward and backward pumps have substantially different optical frequencies, so that the gain magnitude and gain bandwidth of the four-wave mixing interaction can be optimized. In so doing, we are better able to have two pumps with large frequency separation, which can be difficult if only a single fiber type is used because the optimal pump wavelength to maintain a desired nonlinear gain profile is limited due to phase matching constraints in the fiber. Using fibers with different characteristics, such as different zero dispersion wavelengths, allows a system to have a larger frequency separation between the pumps and thus a larger separation between the generated signal frequencies. If other nonlinear medium are used a similar optimization of the two nonlinear processes can take place, for instance by using periodically poled nonlinear medium which have a different periodicity of their poling and therefore a different phase-matching wavelength. The phase matching condition of both nonlinear interactions can be optimized for their respective pump wavelengths and do not in general need to be the same.

We note that the wavelengths of pump$_F$, pump$_B$, and the seed, can be shifted with respect to each other. For instance, we could modify the seed frequency to be f$_o$+d. In this case the forward banded ADM 13 would send the UB to Out$_F$ 14 and the LB to be combined with pump$_B$ in the second pump DWDM ADM 16. Or, we could modify the backward pump to be f$_o$+δ/2. In this case instead of the LB comb forming at frequencies lower than the seed by nδ where n is an integer (and at the corresponding conjugate wavelengths) they would form at frequencies higher than the seed by nδ. Such different configurations are inherently part of the system, but we will continue to use the initial case as a typical example case to illustrate the nature of the invention.

The seed wave injected into the seed injection port 4 can be a single optical frequency, or multiple optical frequencies. For instance, if the seed signal consists of two optical frequencies separated by Δ, then the generated "comb" will be a series of optical frequencies separated by Δ spaced at integer multiples of δ. This is a non-traditional comb with unequal spacing between the various comb lines.

Figure 2:
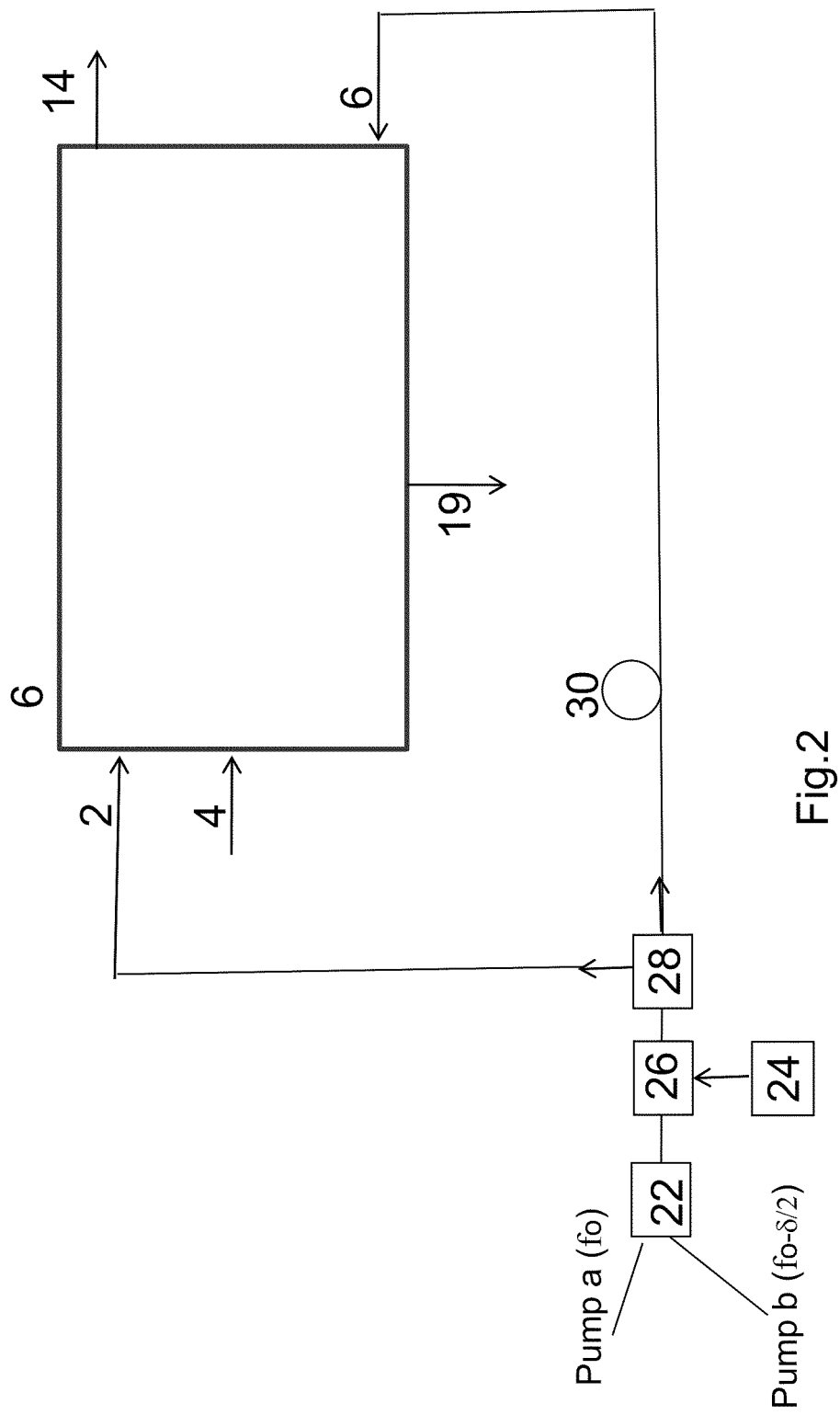
FIG. 2 shows a method for pumping an OSG by creating two optical spectral lines with a fixed frequency separation and a correlated chirp. These optical lines are used as pumps for the OSG in order to expand their frequency bandwidth, thereby reducing SBS.

Controlling the pump intensity, frequency, or phase prior to the nonlinear interaction allows for the generated output signal frequency to also be manipulated. The seed wave can also be controlled in intensity or frequency to affect the spectrum of the output. One application where the pump phase is modified is shown in FIG. 2. Here the pump waves will be phase modulated (a phase modulation that changes with respect to time is also a frequency modulation) so that they will occupy a larger optical spectrum and thereby reduce the deleterious effect of Brillouin scattering of the pump in the NL fiber based frequency mirrors. The two pump waves will be phase modulated in a synchronous way, so that when they operate on a given propagating signal the difference in frequency between the respective forward and backward pumps is fixed. Thus any frequency chirp (change in frequency with respect to time) on the pumps cancels out on the signal after the signal has propagated though both frequency mirrors. In FIG. 2 this is accomplished by first combining the two pumps at frequencies f$_o$ and f$_o$–δ/2 in a DWDM ADM combiner 22, then phase modulating them both in an optical phase modulator 26 where the phase shift is determined from a driving signal created by a phase driver 24. The phase driver could output a plurality of sinusoidal waves at different frequencies, for instance sine waves at 50, 150, 250, and 600 MHz, which cause the pump spectrum to spread beyond the Brillouin gain bandwidth. The phase driver could also be generated in a variety of other ways, such as a pseudo-random binary phase shift pattern such as a maximal length pseudo-random bit sequence. Here each bit of the pseudo-random sequence is of a time duration short enough such that the pump spectrum is spread beyond the Brillouin gain bandwidth, but the sequence can repeat on a longer time scale. The spectrum of the pumps is thus expanded after the phase modulator 26, and the pumps are separated in a DWDM ADM 28 and sent to their respective OSG inputs 2,6. We note that a delay 30, realized by a fixed length of optical fiber, has been put in between the pump exiting the ADM 28 and the backward pump injection port 6. This delay accounts for the delay inside the OSG, such as propagation time through the forward NL fiber 12, so that the propagating signal which is operated on by a forward pump of a particular instantaneous frequency shift with respect to f$_o$ is also operated on by a backward pump of the same instantaneous frequency shift with respect to f$_o$–δ/2. The delay should be matched to a tolerance that is a small fraction of the rise-time of the applied phase shift, for instance to ~100 ps or less if the applied phase shift has rise-times as fast as 1 ns. If the phase driver generates a repetitive signal, the delay only needs to match the pump delays to an integer number of repetition periods but still to the same tolerance. We note that the instantaneous frequency-shift profile of the pumps can be matched in other ways, for instance by having a different phase modulator for each pump wave and electrically delaying the phase driving signal to one of the modulators to account for the delay.

Brillouin scattering can be controlled by other means, such as using pulsed pumps which inherently have larger optical spectrum. A system similar to FIG. 2, where the phase modulator is replaced with an intensity modulator and the phase driver is replaced with a pulsed electrical signal, could also be used for generating the pulsed pumps and setting their relative delay so that the signal propagating through the OSG that is operated on by a forward pulsed pump is also operated on by a backwards pump pulse. However, this will also produce a pulsed output signal, which may or may not be desired depending on the application.

The system can be configured to function as a time-mode optical signal generator where the optical frequency of the output changes as a function of time. The seed wave can be modulated in time so that it enters the OSG at the same time as the forward pump, but is switched off before the start of the second round-trip so that it is not injected during subsequent round trips. In such a case the output will consist of a pulse or series of pulses whose frequency changes every round trip by increments of $\delta$. The seed wave can be re-injected into the OSG periodically to start the process over again. The seed itself could consist of multiple time-separated frequencies, for instance the seed could consist of two lasers with different center frequencies $f_o$ and $f_o-\Delta$ such that one of the seed lasers is on for the first half of a round trip time, the other is on for the second half of a round trip time, and both are off for subsequent round trips. This would create an output at 19 with a spectral line that varies in time according to the sequence: $f_o$, $f_o-\Delta$, $f_o-\delta$, $f_o-\Delta-\delta$, $f_o-2\delta$, $f_o-\Delta-2\delta$ . . . , thus allowing for an output whose optical frequency changes with a plurality of step sizes.

Figure 3:
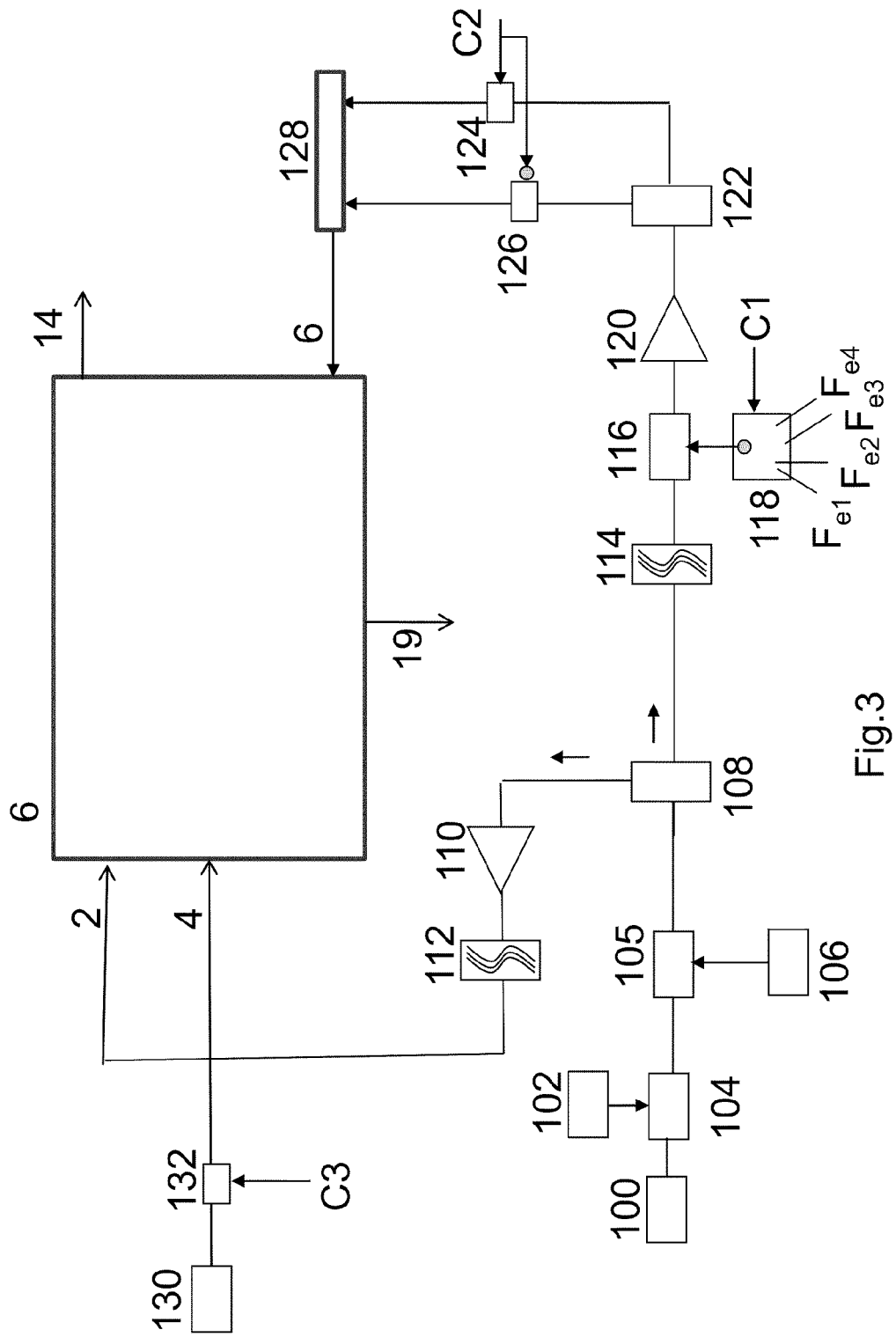
FIG. 3 shows a system that creates time-varying optical output wavelengths based on an OSG and a pump control scheme that allows for the pump wavelengths to be changed on a fast time scale.

Another method of use of the invention is to use a selectable frequency shift to reprogram the pump optical frequencies in a dynamic way and thereby change the frequency of the recirculating pulses by reprogrammable amounts. A particular embodiment is shown in FIG. 3. A pump laser 100 at an optical frequency $f_o-12.5$ GHz is modulated in a CSRZ modulator 104 being driven by a modulator driver 102 generating a sinusoidal radio frequency of 12.5 GHz. This will create two pump waves at frequencies $f_o$ and $f_o-25$ GHz. The pumps are intensity modulated in an intensity modulator 105 into pulses of a duration of 1 ns and a with a pulse separation of 100 ns via an electrical pulse generator 106. The duration and separation of the pulses are variables that can be changed based on the needs of the user and the values here are for illustration only. The two pump frequencies are separated in a DWDM ADM 108 so that the pump band near $f_o$ is sent to the first pump injection port 2 of the OFG 6 after being optionally amplified in an optical amplifier 110 and filtered with an optical bandpass filter 112, while the pump band near $f_o-25$ GHz is filtered in an optical bandpass filter 114 to remove unwanted extraneous side bands generated by the CSRZ modulation then sent to a second CSRZ modulator 116. The second CSRZ modulator is driven by the output of an electrical switch 118 which has several electrical frequencies at the input ($F_{e1}$, $F_{e2}$, $F_{e3}$, $F_{e4}$; with values of 24.8, 24, 22, and 17.5 GHz), so that the input electrical frequency sent to the CSRZ modulator is chosen by a control signal C1 to the switch. The optical output of the second CSRZ modulator has now been shifted in frequency by $\pm F_{ex}$, where x represents the input frequency number chosen by C1. The optical signal is then optionally amplified in an optical amplifier 120 and separated into two separate fibers containing the $f_o-25$ GHz$-F_{ex}$ and the $f_o-25$ GHz$+F_{ex}$ bands respectively by an ADM 122. Note that the various electrical frequency shifts are all fairly large (>5 GHz) to facilitate the separation of the frequency shifted signals with common filter technology. One of the two separated bands is allowed to pass to a combiner 128, which may be realized by another ADM, while the other is blocked. A second control signal C2 determines which of the separated signals passes to the combiner by sending complementary signals to intensity modulators 124,126 in each respective path. The system of modulators 124,126 and the combiner 128 can be viewed as an optical switch controlled by C2. The output of the combiner 128 is then used as the input to the second pump injection port 6. In so doing, depending on the control signals C1 and C2, the backward pump can be at any of 8 frequencies: $f_o-25$ GHz$+$\{24.8, 24, 22, or 17.5 GHz\} and $f_o-25$ GHz$-$\{24.8, 24, 22, or 17.5 GHz\}. The frequency difference between the first and second pumps can take on 8 different values over a wide range including 0.2, 1, 3, 7.5, 42.5, 47, 49, and 49.8 GHz. A seed wave laser 130 is modulated by an intensity modulator 132 using a third control signal C3 so that the seed wave laser only enters the seed wave injection port 4 for some portion of the round-trip time through the OSG. The optical delay of each pump band from the pump intensity modulator 105 to their respective nonlinear elements inside the OSG is such that the seed wave operated on by the forward pump in the first nonlinear element is also operated on by the backward pump in the second nonlinear element. Ideally the control signals C1 and C2 can cause the optical signals to switch between the selectable states in a time period shorter than the pulse separation time. After the first round-trip the generated signal will be shifted from the seed wave frequency by twice the difference between the selected forward and backward pumps. Different pump separations can be selected for different pump pulses during the first round trip if desired. For instance, if the propagation time through the first and through the second nonlinear elements are each ~1 μs, then during the round trip time of ~2 μs up to 20 different pulses can be loaded into the loop during the first round trip. The frequency of a given seed signal circulating around the OFG after the nth round trip will be $f_o-d-\delta_1-\delta_2-\delta_3-\ldots\delta_n$, where $\delta_x$ is twice the frequency difference between the forward and backwards pumps applied during round trip x for this particular propagating signal time-window. In this case up to 20 different such sequences can be generated, one for each pump pulse injected into the system each round trip. We note that the electrical switch 118 with discrete frequency inputs could be replaced with a programmable frequency generator, where C1 now selects the programmable frequency. Also, the various control signals C1, C2, and C3 can come from a control board that provides the control signals in a synchronized manner, such that the frequency to the CSRZ modulator is changed when the optical intensity propagating through the CSRZ modulator is small. The control board could be programmed with the desired output frequency sequences and manipulate the control signals to generate them appropriately.

Another embodiment of the invention is to generate a frequency chirped signal by frequency chirping one or more of the pumps. A chirp typically implies a linear frequency change over time, although we will use the term more generally to apply to any time varying frequency change, with a linear change being the most common type. One can frequency chirp a signal using several means including varying the current to a laser diode, applying a time-varying phase shift via a phase modulator, or chirping the RF frequency sent to a single-sideband modulator. Improvements in chirp range or rate can be attained by applying such a chirp to the pump wave and transferring the chirp to the signal wave. Chirp is inherently multiplied by a factor of two since the signal chirp is twice the frequency difference of the pumps, and can be multiplied by another factor of two if the pumps are chirped in opposite directions. The chirp can also be multiplied further by making more than one round trip through the system, since the chirp is repeatedly applied each round trip.

One example case would be the use of pumps made from laser diodes chirped through the use of current modulation. In this case $Pump_F$ and $Pump_B$ from FIG. 1 can be viewed as being generated by chirped laser diodes. The amount of chirp a laser diode can generate through current modulation is typically limited by the range of current values that allow the diode to lase with an acceptable output power. The use of the OFG, even in a single pass mode, provides several benefits. One is that the current to $Pump_F$ and $Pump_B$ can be varied in opposite directions, creating a quadrupling of the normally attainable output chirp in a given acceptable range of current modulation. However, the current modulation range can likely also be increased, since the power fluctuations on the output signal will be damped by the nonlinear process in the two frequency mirrors. For instance, if a 50% current modulation leads to a roughly 50% power fluctuation in each of the laser diodes, then the output power of each diode will vary by 50% over the chirp range. If such a power fluctuation is unacceptable, then an intensity modulator after the diode could be used to clamp the power to a constant level. However, the action of the nonlinear process leads to an inherent clamping of the output power of the OSG, since the pump powers are modulated in opposite directions. This can be seen by assuming the forward pump intensity varies as $(1+y-2yt)$ and backwards pump intensity varies as $(1-y+2yt)$, where t is a normalized time that varies from 0 to 1 over the chirp period. If we take $y=0.2$, then each pump has a maximum intensity 50% higher than its minimum pump intensity. Such a large power fluctuation may be unacceptable. However, assuming a simple quadratic nonlinear interaction the total effective gain on the conjugate signal after one round trip is related to as $(1+y-2yt)^2*(1-y+2yt)^2$, then the output signal has a minimum to maximum power variation of less than 9%. Thus the power fluctuation has been damped by the action of the cascaded nonlinear processes, or alternatively for a given acceptable maximum output power fluctuation one can have a larger current variation thereby leading to a larger frequency chirp.

Figure 4:
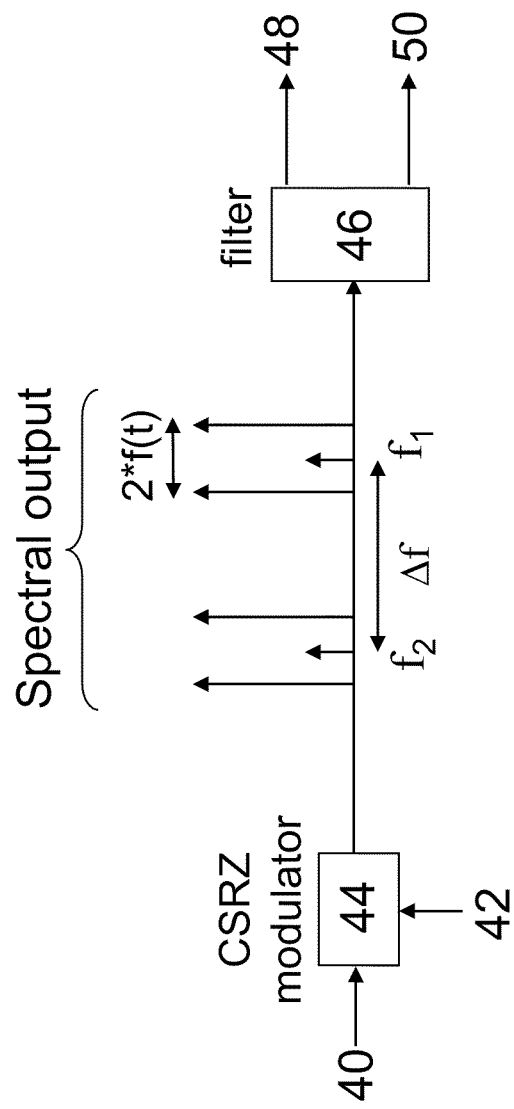
FIG. 4 shows the frequency spectrum at the output of a CSRZ modulator with two input optical frequencies $f_1$ and $f_2$. The CSRZ modulator generates a series of optical tones around each input optical frequency. A filter then selects and separates the desired generated tones to be used as pumps.

Current modulation of a laser diode leads to a potentially large frequency deviation. It may be somewhat easier to maintain higher control over the chirp when using other techniques, such as transferring an electrical chirp in the RF domain to the optical domain with a modulator. A single-side band modulator could be used for such a purpose, but there is an advantage to using a carrier-suppressed return-to-zero (CSRZ) modulator to generate multiple chirped pumps for the OSG. FIG. 4 shows a system for generating chirped pumps well suited for use in a dynamically chirped OSG. In the figure there are two separate input pump optical wavelengths at $f_1$ and $f_2$ are sent to the input port 40 of the CSRZ modulator 44, although we will describe the chirp imparted on just one of them at this time. An optical frequency is sent to the input 40 of a CSRZ modulator 44, and the modulator is driven by a variable RF frequency 42 which we call f(t) since the frequency f can also vary in time t. The output of the modulator suppresses the input optical frequency and generates tones separated from the original input optical frequency by $\pm f(t)$. By chirping the modulator RF frequency f(t), for instance via mixing a center RF frequency with a chirped frequency from an arbitrary waveform generator, one can create two optical spectral lines whose spacing varies in time by twice the RF frequency. These two optical frequencies can be separated in a demultiplexing filter 46, whose outputs 48,50 can then be used to pump an OSG by injecting them into the first and second pump injection ports 2,6. In a single pass configuration (in single pass the seed injected into the OSG goes through each nonlinear interaction once and the resulting signal generated is not recirculated), the signal generated after the two nonlinear interactions is twice the difference between the pump frequencies, and therefore is now four times the RF chirp.

The use of a CSRZ modulator to chirp the pump accomplished two tasks. Firstly, it allows the pump spacing to be very precisely controlled since the spacing is twice the applied RF frequency. Since RF frequencies can be generated with high precision, the corresponding separation of the pumps is also precise. This can be used in any OSG to create precisely spaced and tunable comb lines. By chirping the modulator RF input we are able to transfer the chirp into the optical domain and magnify it by the use of the OSG. Another benefit is that the chirp applied to the optical signal increases the bandwidth of the optical signal which can reduce the SBS effect that might cause the high intensity pump waves to scatter backwards thereby reducing their intensity. Since SBS in typical fibers has a limited bandwidth of ~50 MHz, one method of reducing it is to pulse the pump wave into short pulses of low duty-cycle thereby increasing its bandwidth beyond the SBS bandwidth. If the pump is pulsed to ~20 ns with a repetition period >>20 ns then the corresponding bandwidth is ~1/20 ns=50 MHz and there will be a marginal reduction in SBS. Shorter pulses will have more spectrum and correspondingly less pump scattering loss due to SBS. For some applications the pulse length can not be made short enough or of a low enough duty cycle to suppress SBS. However, if over the course of 20 ns the pump frequency changes by >50 MHz it will start reducing SBS as well. For instance, if the pump chirp is 10 GHz over 500 ns, then the chirp over 20 ns is ~400 MHz, which will substantially reduce SBS.

Another use of the CSRZ modulator could be to simultaneously generate chirped pumps and a chirped seed wave. This can be accomplished since the CSRZ modulator creates additional optical spectrum at frequencies that are $\pm n*f(t)$ away from the carrier, where n is an integer greater than 2, although these tones are of a smaller magnitude. The input seed signal typically has a much smaller magnitude than the pump waves, so the reduced magnitude is not a limiting factor. One such smaller magnitude tone could be used as the seed wave, which would allow the single-pass chirp to become $5*f(t)$.

Although this level of chirp amplification is useful, allowing the signals to make multiple round trips around the closed loop OSG creates even more chirp amplification. After n round-trips the chirp is amplified an additional n-times, provided that the pump chirp is periodic such that it repeats every round trip. This will amplify the chirp, but the chirp will accumulate over several round trips.

In order to generate large amounts of chirp without waiting several round trips, one can use the upper and lower signal bands created in a first single-pass OSG as the two pumps in a second single-pass OSG. Here the optical frequencies of the two pumps used in the second OSG differ by 8 times the applied RF frequency chirp (each is chirped 4 times the input RF chirp to the CSRZ modulator 44 but in opposite directions) and therefore create a new signal with a chirp 16 times the applied RF chirp. In this case, the two pumps in the second OSG likely differ by a substantial optical frequency, so it may be particularly important to have nonlinear fibers of different zero dispersion parameters for the forward and backward nonlinear elements in the second OSG. Some advantages of such a single-pass configuration are that the chirp can be large, reprogrammed with minimal delay, and present at the output continuously in time.

Let us take as an example a case where the RF mixing creates a driving signal that is chirped from 25-27 GHz over a 500 ns time interval. This would create two optical lines separated by 50 to 54 GHz, where the separation is a function of time. The RF frequency driving the modulator $f(t)=\delta(t)/4$, where $\delta(t)$ varies from 100 to 108 GHz over 500 ns. The two generated pump lines are at $fo\pm(\delta(t)/4)$, far enough apart in wavelength to be separated by standard filtering methods. One line can then be used as the forward pump and one as the backwards pump in an OSG. It is advantageous if the optical paths in the system are matched so that the backward pump and the forward pump that operate on a given time-slice of the propagating signal have substantially the same magnitude of frequency shift, but frequency shift, but in opposite directions, from $f_o$. This reduces the effect of discontinuities and makes it easier to design a system that can function properly over many round trips.

The first tone generated in the LB will be at $fo-d-\delta(t)$, since the frequency difference between the pumps at any given time is $\delta(t)/2$. If the pump chirp is controlled so that its frequency deviation repeats every round trip then the second generated tone after two round trips will be at $fo-d-2\delta(t)$, and similarly the nth line (or nth order tone) will be $fo-d-n*\delta(t)$. Thus, one can filter out, say, the $10^{th}$ line to isolate a chirped optical frequency from $fo-d-1$ THz to $\omega o-d-1$ THz$-80$ GHz, where the chirp occurs over 500 ns. The system has multiplied the chirp seen on two optical pumps, where each pump is individually chirped by just 2 GHz, into an 80 GHz optical chirp. The outputs of the system are combs whose frequency grid is chirped in time. Since each chirped signal line is separated by at least 100 GHz, each chirped line can be filtered out and used as desired, for instance by placing a dense wavelength division multiplexing (DWDM) demultiplexer at one or more of the OSG outputs 14,19.

The 40× chirp magnification of the previous example could be increased by having a larger center frequency of the RF driving signal so that a line >10 units away from the seed wave can be isolated. A larger center frequency spaces the pumps further in optical frequency and therefore spaces the generated chirped comb lines further apart in optical frequency. Such a larger center frequency is useful in order to generate chirped lines spaced far enough apart in optical frequency space to allow for the lines to be uniquely separated via simple passive wavelength filtering even if some carry very large chirps. Uniquely separating the chirped lines using passive filters, which may be desirable due to its simplicity, requires that the minimum separation between the lines is larger than the maximum chirp value. One way to accomplish a large separation between the chirped lines without using a large RF center frequency, since such a large RF frequency may be inconvenient to generate and is limited in magnitude by electro-optical technology, is to have two different lasers entering the CSRZ modulator, as shown in FIG. 4. Here two different optical frequencies which differ by a fixed amount $\Delta f$, let us assume here about 250 GHz, or equivalently about 2 nm in wavelength for 1550 nm light, are input to the optical input 40 to the CSRZ modulator 44. The exact frequency difference of the two optical inputs should match the CSRZ modulator so that both wavelengths can simultaneously be suppressed at the output, or alternatively one can use two different CSRZ modulators and tune their bias phase individually so that both carrier wavelengths are suppressed. An electrical RF input 42 to the CSRZ at a frequency $f(t)$ modulator creates various additional tones separated from the carriers by the RF driving frequency, where the RF driving frequency f can vary with time t. The output is filtered using an optical filter system 46 to collect just the two generated frequencies that are $+f(t)$ from the higher frequency input optical carrier and $-f(t)$ from the lower frequency input optical carrier, so that the two collected optical tones vary from each other by about 250 GHz$+2*f(t)$. Using these two time-varying tomes as pumps on the OSG, resulting output signal chirps approaching 500 GHz can be separated by optical filters, since the smallest spacing between any two tones is 500 GHz. Alternatively, one of the pumps can be chirped with the other held at a fixed frequency where one or both of the center optical frequencies are tunable. Again, such a configuration allows the frequency difference between the two pumps to be tuned as desired by tuning the optical frequency of one of the pumps. Note that other methods of chirping the pump, including changing its driving current, controlling the drive voltage to a phase modulator, using a single-sideband modulator or using an acousto-optical Bragg grating can also be used. The CSRZ method is simply one preferred embodiment.

Another embodiment would be to have a small difference, including possibly zero difference, between the initial center frequencies of the two pumps, and separate the desired chirp in the time (rather than the wavelength) domain. For instance, if the RF signal to a CSRZ modulator is chirped from 5-15 GHz then the base separation between the generated signal lines will vary continuously between $4*5*n$ GHz to $4*15*n$ GHz, where n represents the order of the optical line in question (number of round trips). Since the chirp is greater than the minimum spacing between the signal lines one can not separate out a single chirped signal by passive spectral filtering. However, if the seed signal is turned on only for the initial round trip, then the various orders (n) of the signal are separable in time since each increment in n represents a round trip time. An optical modulator can be placed at the output 14,19 and used to select only one of the orders or an optical switch can separate several orders to different fiber lines for subsequent use. For instance, if the modulator only allows the 20th round trip to pass (n=20) then the chirped output will be chirped $20*40$ GHz=800 GHz. This allows for larger chirps since more of the available optical gain bandwidth can be used for a given signal order, however the signal is only available for a limited time interval—in this case every $20^{th}$ round trip (5% of the time).

A similar system can be built using a single pump laser, splitting the output of the laser, and chirping one of the two outputs using a phase modulator such that the optical frequency deviates from 0 to $\Delta_1$ over time. This could be accomplished, for instance, by driving an electro-optical phase modulator with a quadratic voltage profile $V(t)=(c/2)*t^2$, where c is a constant and t represents time which starts at t=0 initially and continues until the end of the chirp time-interval. The resulting optical frequency is shifted by $c*t$, thereby linearly changing with time, but starting at a 0 frequency shift. The split laser output can be one of the pumps to the OSG while the split-then-chirped output could be the other. The seed is input to the device during the first round-trip (or some portion of a round-trip). After the first round-trip the recirculating signal will be chirped from the initial seed optical frequency to 2*c*t. After the second round-trip it will be chirped from the initial seed optical frequency to 2*2*c*t. After the nth round trip the chirp will be from the initial seed optical frequency to n*2*c*t. In this way the initial starting frequency of the time-varying chirped signal is the same for every round trip, but the frequency deviation of the chirp keeps increasing as the signal propagates around the system. Chirp can thus be generated over the entire optical gain bandwidth of the upper and lower bands. The basic principle that the pumps are initially closely spaced in frequency, perhaps with zero frequency shift between them, where at least one is chirped over time allows for the wide band chirp over the entire optical gain bandwidth. The chirp level will change depending on the number of round trips made, but a particular chirp level can be isolated by time-gating the output with an optical modulator. The invention could be realized with other types of chirping mechanisms, such as the use of a single-sideband modulator instead of a phase modulator. If the seed signal is a set of comb lines then a chirped comb spectrum will be created. Other seed signals such as multiple lines of unequal frequency spacing could also be used. We also note that instead of chirping just one pump they both could be chirped in opposite directions to further increase the overall chirp level.

One can also chirp the seed wave in order to further amplify (or deamplify depending on the chirp direction) the generated output chirp. Chirping the seed wave by an amount $\Delta f$ will add an additional chirp of $\Delta f$ to the resulting signal. One way to use this property would be to use two pumps with a constant frequency difference, and chirp the seed by an amount very nearly or exactly twice this frequency difference during the first round trip or portion of a round trip. In this case the seed will chirp from the initial seed optical frequency $f_o-d$ to the first order frequency $f_o-d-\delta$ during the first round trip (or portion of a round trip). The second round trip the recirculating signal will start at $f_o-d-\delta$ and chirp to $f_o-d-2\delta$. The nth round trip the recirculating signal will start at $f_o-d-(n-1)\delta$ and chirp to $f_o-d-n\delta$. Thus the output signal will sweep out a nearly constant chirp from $f_o-d$ to $f_o-d-n\delta$ over the n round trips, although if the frequency chirp of the seed does not exactly equal twice the frequency difference of the pumps, then there could be a discontinuity in the chirp. If the seed chirp is not timed precisely such that the seed starts and ends its chirp over a round trip then there will be an amplitude discontinuity in the signal. It may be beneficial to amplitude modulate the seed or pump so that discontinuities in frequency occur in regions of time where the optical amplitude is low.

A different embodiment could use pumps of fixed frequency difference and input the chirped seed wave during all round trips, thereby creating a chirped comb where the comb separation depends on the pump frequency separation and the comb-line chirp is equal to the seed chirp.

Figure 5:
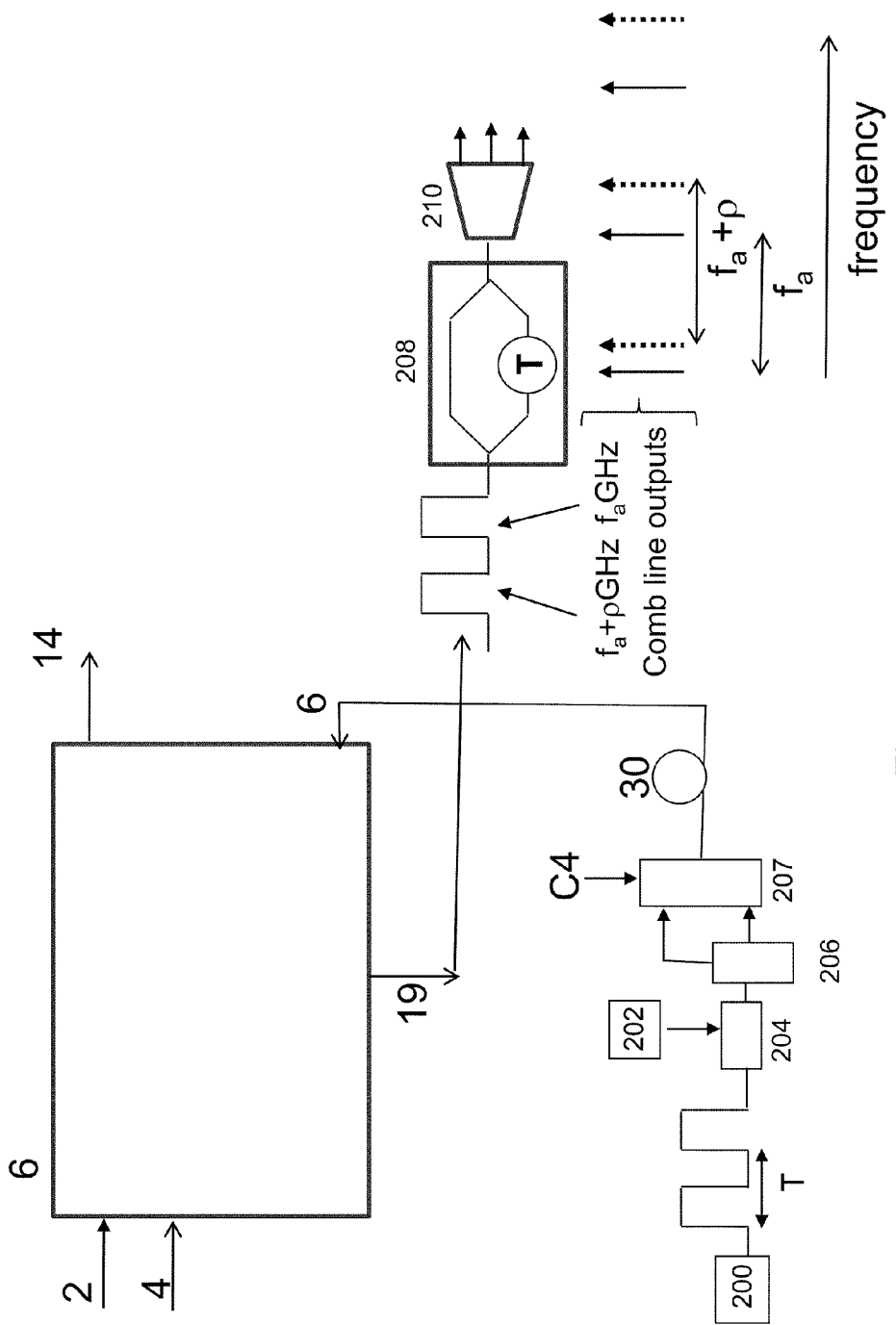
FIG. 5 shows an OSG pumped by two time-separated backward pump pulses that are shifted in frequency by different amounts, thereby generating two time separated comb signals with different comb spacing. The two combs are combined in an asymmetric Mach Zehnder interferometer 208 and desired tones are separated in a DWDM demultiplexing filter.

Another embodiment of the invention is to use system to create two frequency combs of different frequency spacing. This can be done, for instance, by multiplexing the backward interaction into multiple space or time modes. The same function could be performed by multiplexing the forward nonlinear interaction or both the forward and backwards interactions. For concreteness consider the system shown in FIG. 5. Here an intensity modulated laser 200 outputs two pump pulses with a separation in time T with optical frequencies $f_o+112.5$ GHz. The two pump pulses enter a CSRZ modulator 204 driven by a sinusoidal frequency generator 202 that generates a frequency of 12.5 GHz. An ADM 206 separates the tones at $f_o+100$ GHz and $f_o+125$ GHz, sending them into an optical switch 207 that selects one or the other to become the backwards pump injected into the second pump injection port 6. The switch is reconfigured using control signal C4 so that during the first pump pulse period the $f_o+100$ GHz pump is selected and during the second pump pulse period the $f_o+125$ GHz pump is selected. The backward pump pulse repetition rate is adjusted so that a pump pulse of a given frequency pumps the second nonlinear interaction with a periodicity equal to the round trip time. A seed is injected into the seed injection port 4, and a pump at frequency $f_o$ is injected into the first pump injection port 2. If the forward pump is also pulsed, an optical delay 30 can be inserted to align the timing of the forward and backwards pumps so that they both operate on a signal time-window propagating around the loop. The output at port 14 will be two optical comb pulses, one with a comb spacing $f_a=200$ GHz and the other with a comb spacing of $f_a+\rho=250$ GHz. The output at output port 14 and 19 are thus pulses of combs with one pulse having a comb separation of 200 GHz and the other comb having a comb separation of 250 GHz. These combs could be beat together by using an asymmetric Mach Zehnder interferometer 208 which separates and combines the two inputs with a time delay of T, thereby interfering the two comb pulses. If detected directly on a photodetector, the output would consist of a series of beat terms at the frequency difference between the various comb line spacings, $\rho$, i.e. 50 GHz, 100 GHz, 150 GHz, . . . . Alternatively the beat terms can be separated in a demultiplexing filter 210 so that each beat term is sent to a different output, or any desired term can be selected with a tunable optical filter. The center frequency of the laser 200 from which the backward pump is derived does not determine the various relative frequencies of the optical beat signals. Instead it determines the optical frequency separation between the beat signals. Thus the laser 200 does not need to be precisely frequency locked in order to generate very precise beat terms. The laser frequency 200 is instead chosen to make separating the beat terms easier, while the beat terms are created by the highly accurate CSRZ modulation. Thus the beat terms can be very high quality with low phase and frequency noise.

Figure 6:
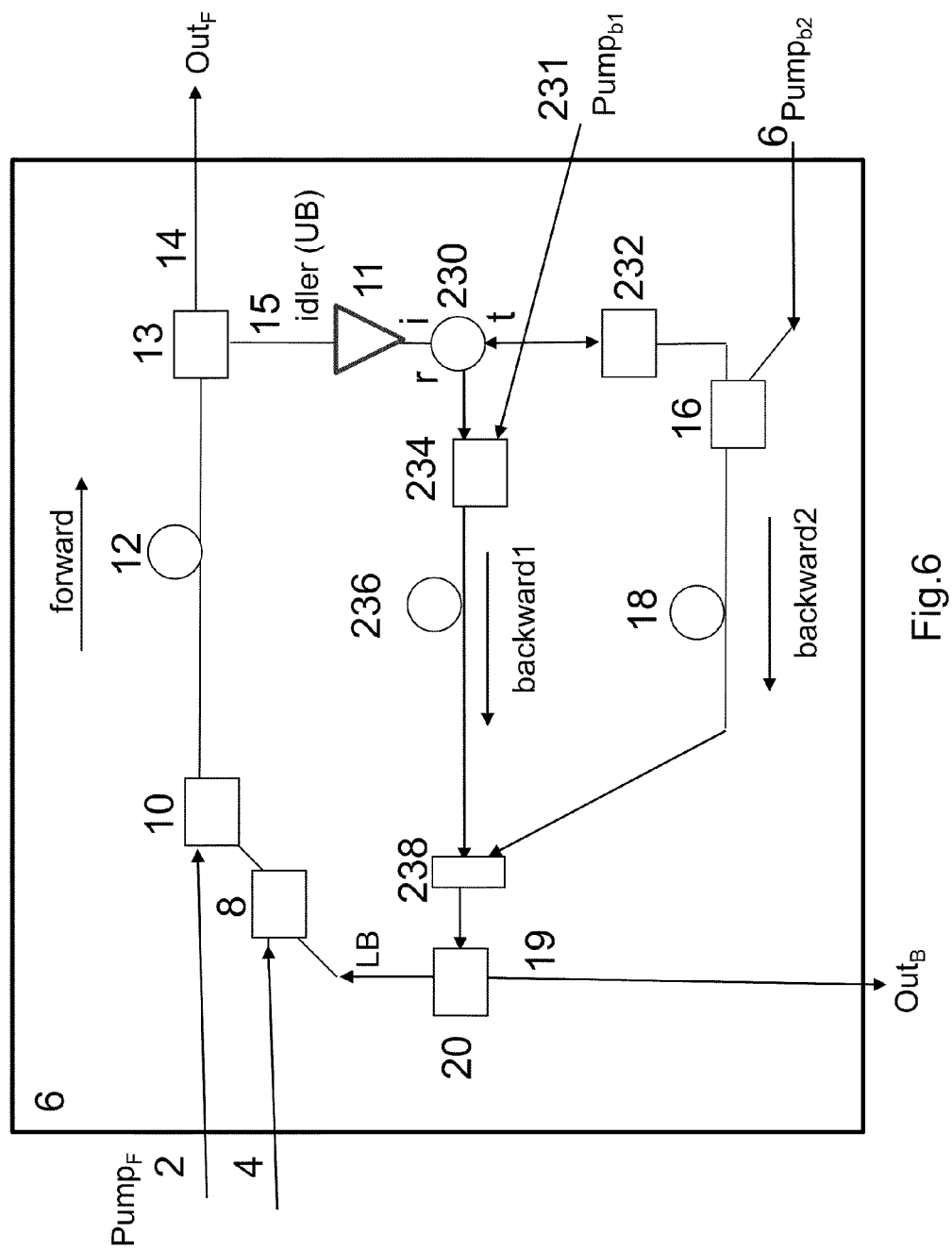
FIG. 6 shows an OSG with two spatially separated backwards nonlinear interactions. The two backward interactions have a different backward pump wavelength. The propagating signal is separated by a periodic filter and a circulator into one or the other backward interactions.

FIG. 6 depicts another embodiment of a two-comb source, this time the two combs with different comb frequency spacing are spatially multiplexed, sharing a common forward nonlinear interaction and having two separate backwards nonlinear interactions. The components are identical to FIG. 1 with the following exceptions. After the in-loop amplifier 11, an optical circulator 230 is used which passes the upper band from the i port to the t port. A periodic filter 232, as can be realized with an etalon, reflects back to the t port of the circulator the optical frequencies that are on the grid of the filter. The circulator then sends the reflected signal from the t port to the r port, where the signal is then combined in a D-ADM 234 with the first backwards pump $Pump_{b1}$ which was injected into the first backwards pump port 231. The pump and signal experience a nonlinear interaction in the nonlinear fiber 236. The remaining optical frequencies not reflected by the periodic filter are combined in a D-ADM 16 with the backward pump $Pump_{b2}$ which is injected via the backward pump injection port 6. The combined output experiences a nonlinear interaction in the nonlinear optical fiber 18. The outputs of both backwards nonlinear interactions are combined in a combiner 238, such as can be realized for instance with a 50/50 optical coupler, and then enter the B-ADM 20. The purpose of the periodic filter is to separate the two comb grids, each grid being at a slightly different comb separation frequency. This allows for two different pumps to independently operate on each grid. The frequency spacing of each grid is twice the difference between the forward optical pump frequency and the respective backward optical pump frequency. We note that the two backward optical pumps may be generated from the same laser, with one being shifted by a frequency shifting element such as an acousto-optical modulator.

Foregoing described embodiments of the invention are provided as illustrations and descriptions. They are not intended to limit the invention to precise form described. Other variations and embodiments are possible in light of above teachings, and it is thus intended that the scope of invention not be limited by this.

What is claimed is:

1. An apparatus for producing an optical beam having spectrum at a plurality of optical frequencies, comprising: a first input optical seed beam connected to a first optical combiner, a broadband optical signal output of the first optical combiner connected to a first add-drop multiplexer that can efficiently combine it with a first narrow-band pump beam, a first nonlinear optical device receiving a first input optical beam from the first add-drop multiplexer, the first nonlinear optical device being connected to a second nonlinear optical device; a first filter that selects a first generated conjugate signal from the first nonlinear device, the first filter being connected to a second add-drop multiplexer that combines the first generated conjugate signal with a second narrow band optical pump; a combined signal from the second add-drop multiplexer being connected to a second nonlinear optical device which generates a second conjugate signal, an output of the second nonlinear optical device being connected to a second filter that selects the second generated conjugate signal, the second generated conjugate signal being connected to the first optical combiner thereby being recirculated to act as a second input optical beam to the first nonlinear device; and one or more output ports connected to at least one of the optical devices in the recirculating optical path so that a recirculating optical spectrum at a plurality of optical frequencies can be accessed as a final output beam.

2. The apparatus according to claim 1, wherein low combining loss in the first and the second add-drop multiplexer provides efficient combining of the pump in one wavelength band and the signal beam in a different, non-overlapping wavelength band, where the pump wavelength band is narrower than the signal wavelength band and an insertion loss of both the pump and signal bands is less than 50%.

3. The apparatus according to claim 1, wherein the first optical combiner is a third add-drop multiplexer that combines the first narrowband input seed beam with the second conjugate signal, and wherein both the narrow band input seed beam and the conjugate signal both experience less than 50% loss when propagating through the third add-drop multiplexer.

4. The apparatus according to claim 1, wherein the first nonlinear optical device having the input optical pump with a reference frequency $F_1$, the first nonlinear optical device generating the first conjugate signal with an optical frequency located such that $F_1$ is at an optical frequency at the mid-point between the first input signal and the generated first conjugate signal, and wherein a second nonlinear optical device having the input optical pump with a reference frequency $F_2$, the second nonlinear optical device generating the second conjugate signal with an optical frequency located such that $F_2$ is at the mid-point between the input signal to the second nonlinear device and the second generated conjugate signal, and whereas the final output optical beam consists of optical frequencies determined in part by the difference between $F_1$ and $F_2$.

5. The apparatus according to claim 1, further comprising: an optical amplifier located after the first or the second filter which amplifies the first or the second conjugate signal of one of the nonlinear interactions.

6. The apparatus of claim 1, wherein phase matching properties of the first and second nonlinear interaction are different so as to allow for the first and second pumps to have substantially different optical frequencies but still generate conjugate signals effectively.

7. The apparatus of claim 6, wherein the first and second nonlinear devices are composed of nonlinear optical fiber, and whereas a zero-dispersion wavelength of the first and second nonlinear fibers are not the same.

8. The apparatus according to claim 1, wherein one or more of the pump beams are frequency modulated to impart a frequency modulation to the final output signal.

9. The apparatus of claim 8, wherein the pumps are generated by a carrier-suppressed return-to-zero modulator driven by a chirped modulation signal.

10. The apparatus of claim 8, wherein the first and the second pumps are frequency chirped in opposite directions, thereby generating chirped conjugate signals in the nonlinear devices.

11. The apparatus of claim 10, wherein the chirping is performed through the use of current modulation in lasers, producing the pump beams.

12. The apparatus of claim 10, wherein the pump chirps are timed so that a first chirped conjugate signal generated in the first nonlinear optical being pumped by the first chirped pump signal enters the second nonlinear optical device at a time such that a second chirped pump and the first chirped conjugate signal both begin their respective chirping cycles simultaneously.

13. The apparatus of claim 12, wherein the pump chirp is periodic with a periodicity equal to a round trip time through the device, such that the chirp of a signal builds up over multiple round trips.

14. The apparatus of claim 1, wherein both pumps are frequency modulated such that their frequency modulations are correlated, and the relative delay of the two pumps to their respective nonlinear optical devices is timed such that the instantaneous frequency deviation of the two pumps operating on a propagating signal are equal and therefore the frequency modulation of the pumps does not create a frequency modulation on the signal after the signal has propagated an integer number of round trips.

15. The apparatus of claim 1, wherein a signal wave is injected as the first input optical beam into the first nonlinear optical device for some fraction of the first round trip time, then switched off during one or more subsequent round trip times, such that the final output signal experiences a frequency shift determined by a frequency difference between the first and second pump reference frequencies upon each round trip.

16. The apparatus of claim 15, wherein the frequency difference between the pumps is controllable such that the frequency shift of the propagating signal can be changed to a plurality of values each round trip, creating an output signal which can change in frequency each round trip to one of a plurality of values.

17. The apparatus of claim 16, wherein the pump optical frequency shift is determined by the electrical frequency driving a carrier-suppressed return-to-zero modulator.

18. The apparatus of claim 15, wherein the frequency difference between the pumps is controlled by the use of one or more carrier-suppressed return-to-zero modulators.

19. The apparatus of claim 15, wherein the frequency of the injected signal wave is modulated during the first round trip time.

20. The apparatus of claim 1, wherein the pumps are generated by a carrier-suppressed return-to-zero modulator with a single optical input frequency that is driven by an electrical driving frequency, and whereas an output of the carrier-suppressed return-to-zero modulator thereby contains two new optical frequencies separated from the input optical frequency by the driving frequency, these two optical frequencies being separated by an optical filter to be used as the two pump beams.

21. An apparatus for producing an optical beam having frequency modulated optical spectrum,
comprising:
a first optical combiner that combines an optical input signal beam and a first frequency modulated pump beam, the combiner connected to a first nonlinear optical device,
the first nonlinear optical device generating from the input signal beam and the frequency modulated pump beam a conjugate optical frequency signal that is at a different frequency from both the optical input signal beam and from the pump beam where the conjugate beam is frequency modulated by the pump beam,
the first nonlinear optical device connected to a second nonlinear optical device;
a filter that selects a first generated conjugate signal from the first nonlinear device, the filter being connected to a second optical combiner that combines the first generated conjugate signal with a second frequency modulated optical pump; the second optical combiner being connected to a second nonlinear optical device which generates a second conjugate signal whose frequency modulation is determined by a difference of the frequency modulations of the first and second pump, whereas an output optical beam is an output of the second nonlinear optical device.

22. The apparatus of claim 21, wherein the pumps are frequency modulated in a conjugate manner.

23. The apparatus of claim 22, wherein the pumps frequency modulation is performed using a carrier-suppressed return-to-zero modulator driven with a frequency modulated electrical driving signal.

24. The apparatus of claim 21, wherein the second optical combiner is a wavelength division multiplexing optical add-drop multiplexer that can combines with less than 50% loss the first generated conjugate signal with the second optical pump.

25. A method of creating an optical signal, comprising: using a first nonlinear optical device with a pump beam optical frequency having a reference frequency $F_1$ to shift at least some of an input beam power to a first conjugate optical frequency beam such that the pump reference frequency is symmetrically located at a midpoint between the input beam and the first conjugate beam frequencies; filtering an output of the first nonlinear optical device so as to send the first conjugate signal to a second nonlinear optical device, the second nonlinear optical device with a pump optical frequency having a reference frequency $F_2$, generating a second conjugate optical frequency beam, wherein $F_2$ is at a midpoint between the first conjugate optical frequency sent to the second nonlinear device and the second conjugate optical frequency; filtering the second conjugate signal from the second nonlinear device; and recirculating the second conjugate signal back to the first nonlinear optical device using an add-drop multiplexer which combines the pump at the reference frequency $F_1$ with the second conjugate beam, whereas a final output optical beam at a plurality of optical frequencies is accessible via an optical port connected to one of the optical elements in the recirculating loop.

26. The method of claim 25, further comprising: modulating one or more of the pump reference frequencies with a periodicity equal to a round trip time through the apparatus to generate a frequency modulated output.

27. The method of claim 25, further comprising: modulating the input beam so that it is on only during some fraction of a first round trip time, then turned off for at least a second round trip time, and modulating one or more of the pump reference frequencies beams such that a difference in frequency between the two pumps can be selected among a plurality of values such that the frequency difference of the resulting output beam can be changed at least every round trip through the system.

28. The method of claim 27, wherein the pump frequency difference is determined by a driving frequency sent to one or more chirped return-to-zero modulators.

29. The method of claim 28, further comprising: sending an initial pump beam having a single optical frequency into a carrier suppressed return to zero modulator, modulating the carrier suppressed return to zero modulator with a chirped driving frequency, separating two optical signals with opposite chirp exiting the modulator and using said optical signals as the first and the second pump beams.

30. A method of creating an optical signal, comprising: shifting a first input beam from its original spectral location to a new spectral location that is conjugate to the original spectral location using a first nonlinear process pumped by a first optical frequency beam; filtering the first conjugate beam so that the original beam frequency is removed; using at least a first portion of the first conjugate beam as a second input beam to a second nonlinear interaction pumped by a second optical frequency; separating at least a part of one or more of the conjugate beams to be used as an output signal; and wherein one or more of the pump optical frequencies beams are frequency modulated so as to impart frequency modulation on the output signal that is greater than the frequency modulation of the pump optical frequency.

31. The method of claim 30, wherein the first input beam is injected into the first nonlinear optical device for some fraction of the first round trip and turned off for one or more subsequent round trips.

32. The method of claim 30, wherein the second conjugate beam is fed back to the first nonlinear optical interaction in order to build up increasing amounts of chirp, and the frequency modulated optical pump beam is frequency modulated with a repetition period equal to an integer number of round trips.

33. The method of claim 32, wherein the first conjugate beam is separated so as to send some of the beam into a third nonlinear device pumped by a third pump beam with a frequency $F.sub.3$; the output of the second and third nonlinear devices being combined before feeding the resulting signal back to the first nonlinear optical device.

34. The method of claim 33, wherein separating of the first conjugate beam from the first nonlinear interaction is performed via a periodic filter so that the second and third nonlinear interactions can be seeded with different optical frequency grids.

35. The method of claim 33, wherein one or more of the pump reference frequencies is changed in time so that it has a plurality of frequencies during a plurality of sub-intervals of a round trip time, and wherein each round trip the pump reference frequency is changed in a similar way, thereby leading to the generation of the output signal with a plurality of time intervals where in each time interval an optical comb with a different optical comb frequency spacing is generated.

36. The method of claim 30, wherein the filtered conjugate optical signal out of the first or second nonlinear optical device is amplified using an optical amplifier.

* * * * *